June 26, 1956  E. L. HARRIS ET AL  2,751,791
ENDLESS SPROCKET CHAIN
Filed July 27, 1953
FIG.1.
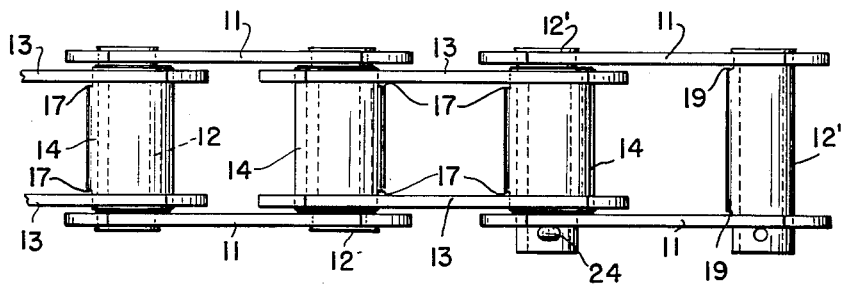
FIG.2.
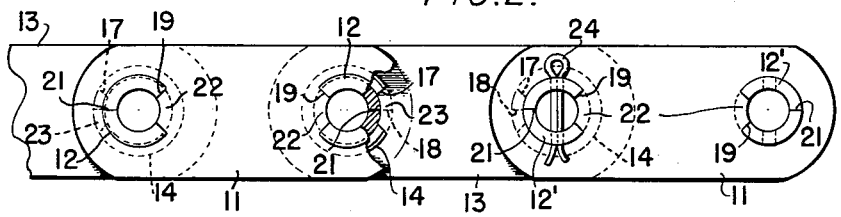
FIG.3.  FIG.4.  FIG.6.  FIG.7.
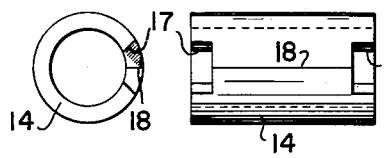 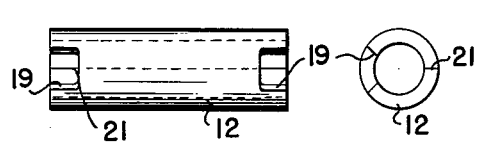
FIG.5.  FIG.8.
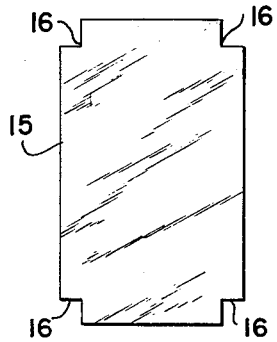 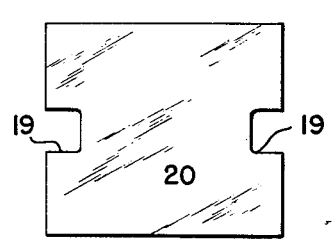
EDGAR L. HARRIS
SAMUEL C. HARRIS
INVENTORS
BY George A. Evans
ATTORNEY

United States Patent Office 2,751,791
Patented June 26, 1956

2,751,791

ENDLESS SPROCKET CHAIN

Edgar L. Harris, Brookfield Township, Waukesha County, and Samuel C. Harris, Milwaukee, Wis., assignors to Chain Belt Company, Milwaukee, Wis., a corporation of Wisconsin Application July 27, 1953, Serial No. 370,572

3 Claims. (Cl. 74—254)

This invention relates to an improved construction of sprocket chain such as is used in moderately heavy duty service. The chain of this invention is particularly well adapted for use as a drive chain on certain classes of agricultural implements, as an example on manure spreaders, where low cost is of paramount consideration, but where it is desirable to furnish a stronger chain than has been generally employed in the past. With the usual attachments, the chain is also well suited for conveyer applications.

One of the objects of this invention is to provide a bushed chain which may be interchangeable with chains heretofore employed and in which split, hollow pins may be used to reduce cost and weight without sacrificing the strength of the chain.

Another object of the invention is to provide an improved construction of hollow connecting members for such chains and means for securing them in the longitudinal members of the chain so that the cross members are prevented from turning in or pulling out of the longitudinal members and stress concentrations are avoided in these members.

Still another object is to produce a low cost chain with split, hollow, cross connecting members arranged so that improved wearing qualities are obtained by the journal formed by one such member extending through the other.

According to the present invention, the cross connecting members, generally referred to as pins and bushings, are made from flat stock in a forming operation such as curling, the flat blanks being notched prior to curling to provide a lock with lugs in the side plate apertures in which the ends of the cross members extend. In the case of the bushings, which are the outer members of the journal, the notches are adjacent the seam and are located on the inner side of the cross member when the latter is assembled in a link, whereas in the case of pins, the notches are opposite the seams and the seams are on the outer sides of the pins. Thus the seams are substantially 180° from the contacting surfaces of the journal when a straight section of chain is placed in tension, insuring that the seams do not interfere with bearing action during articulation of the chain. On the other hand, the lugs which extend into the side bar apertures for locking the hollow members against turning are always on the inner side of such apertures and do not produce undesirable stress concentrations in the side bars. As a final assembly operation, the hollow members are riveted to prevent their endwise displacement, the abutment between the ends of the notches in the hollow members and the lugs extending from the apertures supporting the side bars during the riveting operation.

An embodiment of the invention is illustrated in the accompanying drawings wherein:

Fig. 1 is a plan view of a portion of a strand of chain of the present improved link construction;

Fig. 2 is a side elevation of the chain illustrated in Fig. 1, with certain parts broken away;

Fig. 3 is an end view of one of the hollow bushings used in such chain;

Fig. 4 is a side view of the bushing shown in Fig. 3;

Fig. 5 is a view of the bushing blank prior to its being made round;

Fig. 6 is a view similar to Fig. 3 of the end of the hollow pin;

Fig. 7 is a side view of the pin after forming; and

Fig. 8 is a view of the flat pin blank prior to forming.

In the drawings the chain consists of what will be termed the outer, pin links and the inner bushing links. Each pin link has longitudinal side bars 11 spaced apart and connected by hollow cylindrical cross members or pins 12 arranged near the ends of the side bars. The bushing links have similarly shaped, spaced side plates 13 connected by hollow cylindrical members or bushings 14, the bushings being sufficiently larger than the pins to provide a journal and the width of the bushing links being sufficiently less than the distance between the side bars of the pin links to permit articulation of the links in the customary manner.

The side bars 11 and 13 of both types of links are apertured to permit the hollow cross members 12 and 14 to extend a slight distance beyond their outer sides respectively, and the cross members are prevented from turning in the side bars by locking means hereafter described.

Both hollow pins 12 and bushings 14 are formed from flat stock, the shape of a bushing blank 15 being illustrated in Fig. 5. Notches 16 are formed in the corners of the blank and after the blank is curled to form the hollow cylindrical member illustrated in Figs. 3 and 4, the notch 17 at each end is adjacent the ends of the bushing seam 18 formed by the abutting edges of the curled blank. The depth of the notches 17 is slightly greater than the thickness of the side bars 13 so that the bushings may extend slightly beyond the side bars to permit the ends to be riveted, as previously mentioned.

Similarly the pins 12 are formed from flat stock, and then curled, but the notches 19 in the pin blank 20, as illustrated in Fig. 8 are centrally located on the sides of the blank, so that when the blank is curled, the notches are opposite the seam 21, as illustrated in Figs. 6 and 7. The notches 19 are so also slightly greater in depth than the side bar thickness and have a generous radius of curvature at their inner ends to facilitate the formation of round pins during curling.

The pin and bushing link apertures instead of being fully round have inward projections or lugs fitting into the aforesaid notches locking these members against rotation. As illustrated in Fig. 2, the lugs 22 on the pin link side bars 11 are arranged to register with the gaps formed by the notches in the pins 12, the lugs 22 being on the inner sides of the apertures and locating the seams 21 at the opposite, outer sides of the side bars. This location of the lugs in areas of low stress concentration avoids stress concentration which the shape of the lug would otherwise create around the aperture were the lug in another position such as at the outer ends of the aperture.

Similar lugs 23 in the apertures of the bushing links interfit the notches 17 in the bushings and prevent them from turning in their side bars. The inner ends of the lugs are preferably arcs of circles formed as extensions of the inner diameter of the bushings 14 thereby permitting extension and journalling of the pins in the bushings. Likewise the lugs 23 are on the inner sides of the apertures, but the bushing construction disposes the seams adjacent, instead of opposite the lugs, and hence the seams of the journalled pin is adjacent the seam of the bushing through which it extends, said seams being 180° from the contacting surfaces of the journal when the chain is under tension and the links are aligned. The disposition of the seams in this manner enables the chain to flex under load without the seams interfering with bearing action in the journal.

While either the pins or bushings may be press fitted into their respective side bar apertures, it is preferred to employ with this chain a riveted construction in order that closer tolerances can be eliminated and cost of fabrication reduced. A light press fit is desirable to maintain parts in assembled relation. Hence with the bushing link, a side bar is forced over the ends of the two bushings from each end until the lugs 23 abut the inner ends of the notches 17. With side bars thus located and prevented from moving further inward of the link, the ends of the bushing extend slightly beyond the outer sides of the side bar. A riveting operation is then employed to peen over only the outer edges of the bushing ends, the upset portion of the bushing engaging the side bar and holding it firmly on the bushing.

In a similar way, the side bars 11 are mounted on the pins 12 and then riveted. In this riveting operation, it is not essential to avoid reducing the inside diameter of the ends of the pins, because there is nothing turning within them as in the case of the bushings. The engagement between the inner sides of the lugs 22 and 23 with the inner ends of the notches 17 and 19 respectively, supports the side bars during riveting operations and avoids the necessity of using costly fixtures.

For connecting the ends of a strand of chain composed of the alternate pin and bushing links of this invention, a special pin link may be employed having slightly longer pins 12' as illustrated by the links at the right hand end of Figs. 1 and 2. Instead of riveting the ends of these pins, they are apertured as shown and removable cotters 24 are employed to hold the adjacent side bar in place in a well-known manner.

In order that this chain may be used interchangeably with detachable or combination chain, the outside diameter of the bushing must be of relatively large diameter for sprocket meshing. As a result a large bushing is employed, and also a large pin, resulting in greater bearing area and improved resistance to wear. The employment of a hollow pin reduces weight and insures a rugged construction entirely suitable for a great many drive purposes where the use of a standard roller chain might not be warranted.

The invention having been described, what is claimed is:

1. In an endless chain comprising pivotally connected links having longitudinal members consisting of laterally spaced side bars connected to each other by inner and outer cross members, the inner cross member at the end of one link extending through the outer cross member at the end of an adjacent link to provide a journal, said cross members being hollow cylinders with notches at their respective ends and having longitudinal seams throughout their length, said side bars being apertured to accommodate the ends of said cross members and said apertures having smooth interior surfaces except for interfitting lugs engaging said notches in the ends of the cross members to prevent turning of the cross members, the lugs on the bars connecting the inner cylindrical cross member being opposite the seam of such cylinder, the seam of said inner cross member being adjacent the seam of the outer cross member in which it is journalled, and said seams being substantially 180° from the contacting surfaces of said journal when the chain is under tension and the links are aligned.

2. In an endless chain comprising alternate pin and bushing links having spaced longitudinal side bars connected to each other by cross members at the ends of each link, the cross members at the ends of the pin links extending through the cross members at the end of the bushing links to provide journals, said cross members having notches in their respective ends and said bushing links being narrower than said pin links to permit articulation of the links in the customary manner, said side bars being apertured to accommodate the ends of said cross members and having interfitting lugs engaging said notches in the ends of the cross members to prevent turning of the cross members, said lugs being on the inner sides of the apertures and the outer sides of the aperture being free of irregularities tending to produce stress concentration when the links are under tension.

3. In an endless sprocket chain, a link having spaced side bars and an interconnecting cylindrical cross member, said cross member having a longitudinal seam and notches at its outer ends on the side opposite from the seam, and said side bars having apertures for the reception of said cross member and inwardly extending lugs engageable with the notches in the cross member to prevent turning of the member in the side bars, the location of said lugs being on the inner side of the side bar apertures and the outer side of said aperture being free of surface irregularities tending to produce stress concentration while the location of the cross member seam is on the outer end of the link to avoid interference with the journalling members of an adjacent link.

References Cited in the file of this patent

UNITED STATES PATENTS

| 882,317 | Howe | Mar. 17, 1908 |
| 2,068,666 | Dunlop | Jan. 26, 1937 |
| 2,541,157 | Fulke | Feb. 13, 1951 |

FOREIGN PATENTS

| 406,725 | Germany | Dec. 2, 1924 |